United States Patent
Balachandran et al.

(10) Patent No.: US 7,352,714 B2
(45) Date of Patent: Apr. 1, 2008

(54) METHODS AND APPARATUSES FOR ALLOCATING TIME SLOTS TO HALF DUPLEX WIRELESS MOBILE STATIONS

(75) Inventors: Krishna Balachandran, Morganville, NJ (US); Kirk K. Chang, Morganville, NJ (US); Wei Luo, Eatontown, NJ (US); Sanjiv Nanda, Lunenburg, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 1101 days.

(21) Appl. No.: 10/252,797

(22) Filed: Sep. 24, 2002

(65) Prior Publication Data

US 2004/0057407 A1   Mar. 25, 2004

(51) Int. Cl.
*H04B 7/212* (2006.01)
(52) U.S. Cl. .................. 370/322; 370/329; 370/443
(58) Field of Classification Search ........... 370/277, 370/280, 294, 296, 314, 321, 322, 326, 329, 370/336, 337, 345, 347, 395.4, 437, 442, 370/443, 468
See application file for complete search history.

(56) References Cited

U.S. PATENT DOCUMENTS

| | | | | |
|---|---|---|---|---|
| 5,732,076 | A * | 3/1998 | Ketseoglou et al. | 370/347 |
| 5,995,500 | A * | 11/1999 | Ma et al. | 370/337 |
| 6,041,046 | A * | 3/2000 | Scott et al. | 370/319 |
| 6,226,274 | B1 * | 5/2001 | Reese et al. | 370/280 |
| 6,567,416 | B1 * | 5/2003 | Chuah | 370/418 |
| 6,904,032 | B2 * | 6/2005 | Cain | 370/337 |

FOREIGN PATENT DOCUMENTS

EP        1091609 A1 *   4/2001
WO    WO 0211317 A1 *   2/2002

OTHER PUBLICATIONS

Park, Soyoung et al., "An Enhanced Adaptive Time Slot Assignment Using Access Statistics in TD/CDMA TDD System," IEEE VTS 53rd Vehicular Technology Conference, 2001. May 2001, vol. 1, pp. 511-516.*
Nasreddine, J. et al., "Power Control and Slot Allocation in a TD-CDMA System," IEEE 55th Vehicular Technology Conference, 2002. May 2002, vol. 2, pp. 880-884.*

* cited by examiner

*Primary Examiner*—Chi Pham
*Assistant Examiner*—Donald L Mills

(57) ABSTRACT

Methods and apparatuses for allocating control and data time slots to a plurality of wireless mobile stations in a wireless communication system using time division multiplexing. The methods and apparatuses assign such time slots by first placing the wireless mobile stations into a number of different groups. Then, control time slots and anchor data time slots are assigned to the groups in the uplink and downlink frames of a carrier such that the uplink control time slot for each group is maximally spaced in time relative to the downlink control time slot for the same group. Data time slots are subsequently assigned to a particular mobile station by assigning time slots in the uplink and downlink frames which are as close as possible to the group's uplink or downlink anchor data time slots, as the case may be, according to a "grow from center" technique.

8 Claims, 4 Drawing Sheets

METHODS AND APPARATUSES FOR ALLOCATING TIME SLOTS TO HALF DUPLEX WIRELESS MOBILE STATIONS

FIELD OF THE INVENTION

The present invention relates, generally, to wireless communication networks and, more specifically, to methods and apparatuses for efficiently providing data communications for half duplex mobile stations over wireless or cellular communication networks.

BACKGROUND OF THE INVENTION

Over the past decade, wireless mobile stations have become increasingly important in the everyday activities of many people and, for some, life without a cellular telephone would be very difficult. The importance of wireless mobile stations has not been lost on companies in the telecommunications industry who are continuing to improve their product and service offerings. For example, a number of manufacturers now provide wireless communication devices which also enable a user to access the Internet and manage personal information, including contact names, addresses, telephone numbers, email addresses, and other valuable information. As a consequence, the term "wireless mobile station" which has been thought of in the past to include, generally, wireless voice communication devices such as radio or cellular telephones (analog or digital) must now be thought of as including a wider variety of wireless devices which communicate voice and/or data, and which may provide a user with additional functionality as well.

In order to meet the volume of data which must be reliably communicated to and from such wireless mobile stations, various standards bodies are formulating new third generation (3G) standards which support higher data rates. For example, standards organizations such as the European Telecommunications Standards Institute (ETSI), the Association of Radio Industries and Broadcasting (ARIB) and the Telecommunications Industry Association (TIA) are developing new standards to support faster and more efficient wireless communications. Similarly, manufacturers and service providers are working diligently to improve the data communication capabilities of their systems by developing and implementing new wireless communication protocols (or improving on old wireless communication protocols) to provide faster, more robust, and more efficient data communications over-the-air. Many such protocols employ time division duplex (TDD) or frequency division duplex (FDD) modes alone, or in combination. For instance, the general packet radio service (GPRS) protocol has been developed as a packet-switched upgrade for time division multiple access (TDMA) systems. GPRS utilizes TDD and FDD modes in combination. Other improvements include the development of the enhanced GPRS (referred to as "EGPRS") protocol (i.e., which also uses TDD and FDD modes in combination), and may soon include the use of a universal mobile telecommunications systems time division duplex (UMTS TDD) mode to support asymmetrical spectrum allocation and asymmetrical traffic. While this new development may possibly lead to improvements in the data handling capacities of wireless communication systems, there remains the possibility that improvements may not be sufficient enough or may not be deployable soon enough to timely address the growing need for increased data handling capacity.

There is, therefore, a need for methods and/or apparatuses that utilize the existing capacity of wireless communication systems more efficiently to provide data communications for half duplex mobile stations.

SUMMARY OF THE INVENTION

Briefly described, the present invention comprises methods and apparatuses for better allocation of periodically repeating time slots of carrier time frames to wireless mobile stations in a wireless communication system using time division multiplexing. By better allocating such time slots according to a structured method as opposed to a random allocation, the existing capacity of a wireless communication system is more efficiently used to provide wireless communications.

More particularly, in a first form, the present invention comprises a method of allocating time slots periodically repeating in consecutive carrier time frames by assigning a time slot of a carrier in a first data communication direction to a plurality of wireless mobile stations as a control time slot for the first data communication direction and by assigning a time slot of a carrier in a second data communication direction to the same plurality of wireless mobile stations as a control time slot for the second data communication direction. In terms of relative positions in time, the control time slot for the second data communication direction is located at a position in time substantially midway between the positions in time of the control time slot for the first data communication direction in consecutive carrier time frames. The position in time of the control time slot for the second data communication direction is maximally spaced in time relative to the positions in time of the control time slot for the first data communication direction in consecutive carrier time frames.

The present invention advantageously improves the capacity of a wireless communication system by maximizing the number of control and data time slots which are available for assignment to a plurality of wireless mobile devices and by enabling better sharing of the available communication time slots. The maximization is accomplished by breaking the historical association between uplink and downlink time slots as is present, for example, in global system for mobile communications (GSM) systems (i.e., where a downlink time slot is one time slot on a 200 kHz carrier at frequency "f" and the corresponding uplink time slot is one time slot on a 200 kHz carrier at frequency "f+45 MHz) and by recognizing that uplink and downlink resource demands occur independently. In the present invention, all control and data time slots are unidirectional and have independent frequency and slot allocation in the uplink and downlink directions. By grouping multiple half duplex wireless mobile stations into different groups, by assigning to the groups control time slots and "anchor" data time slots in the uplink and downlink directions which are maximally spaced apart in time, and by assigning data time slots to the members of the groups according to a "grow from center" technique, the present invention reduces the likelihood that time slots may be unavailable for use by half duplex wireless mobile stations of a particular group due to idle time required before and after the transmission or reception of data.

Other advantages of the present invention will become apparent upon reading and understanding the present specification when taken in conjunction with the appended drawings.

DETAILED DESCRIPTION OF THE INVENTION

Figure 1:
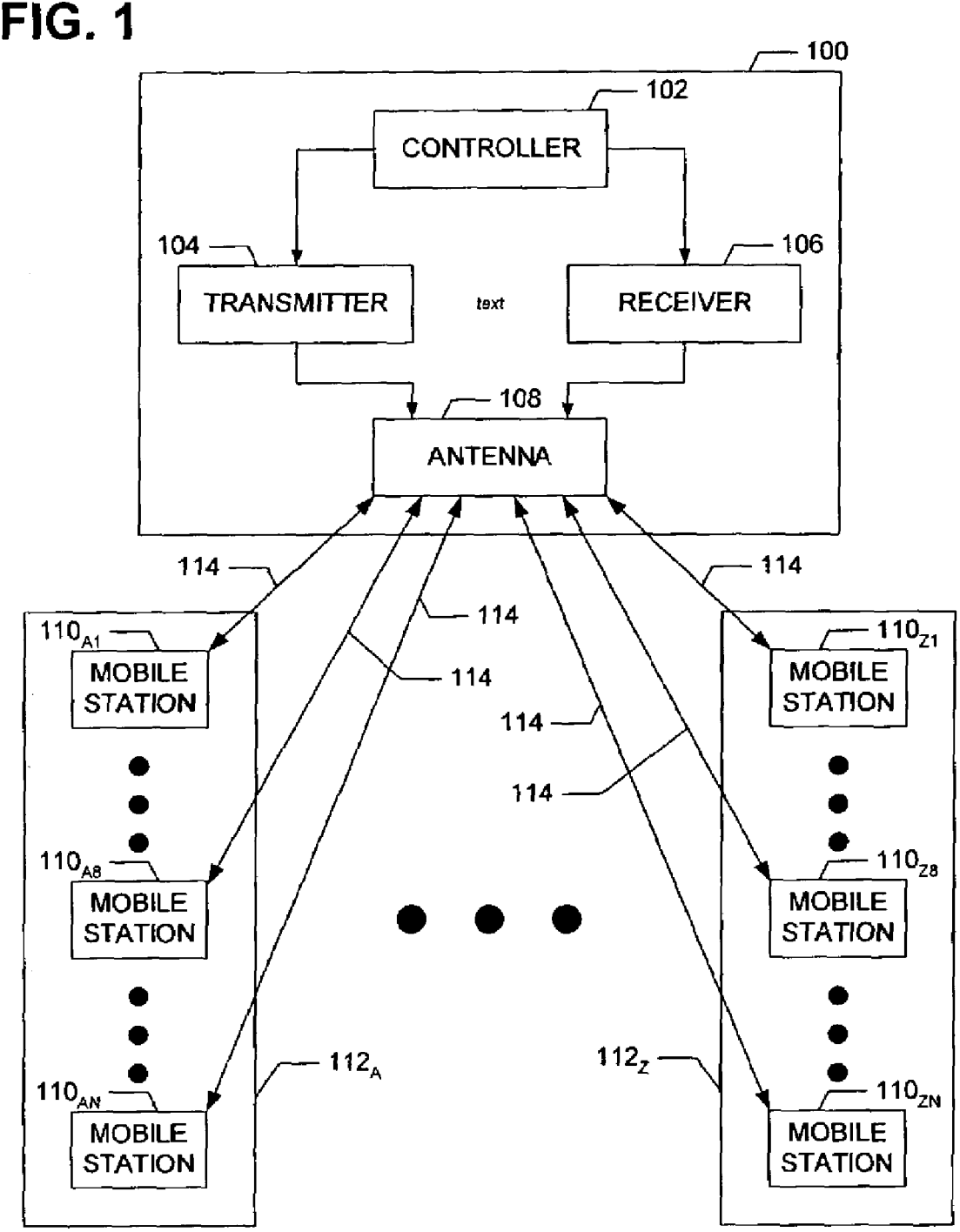
FIG. 1 is a simplified block diagram representing a base station and a plurality of groups of half duplex wireless mobile stations in accordance with an embodiment of the present invention.
Figure 2:
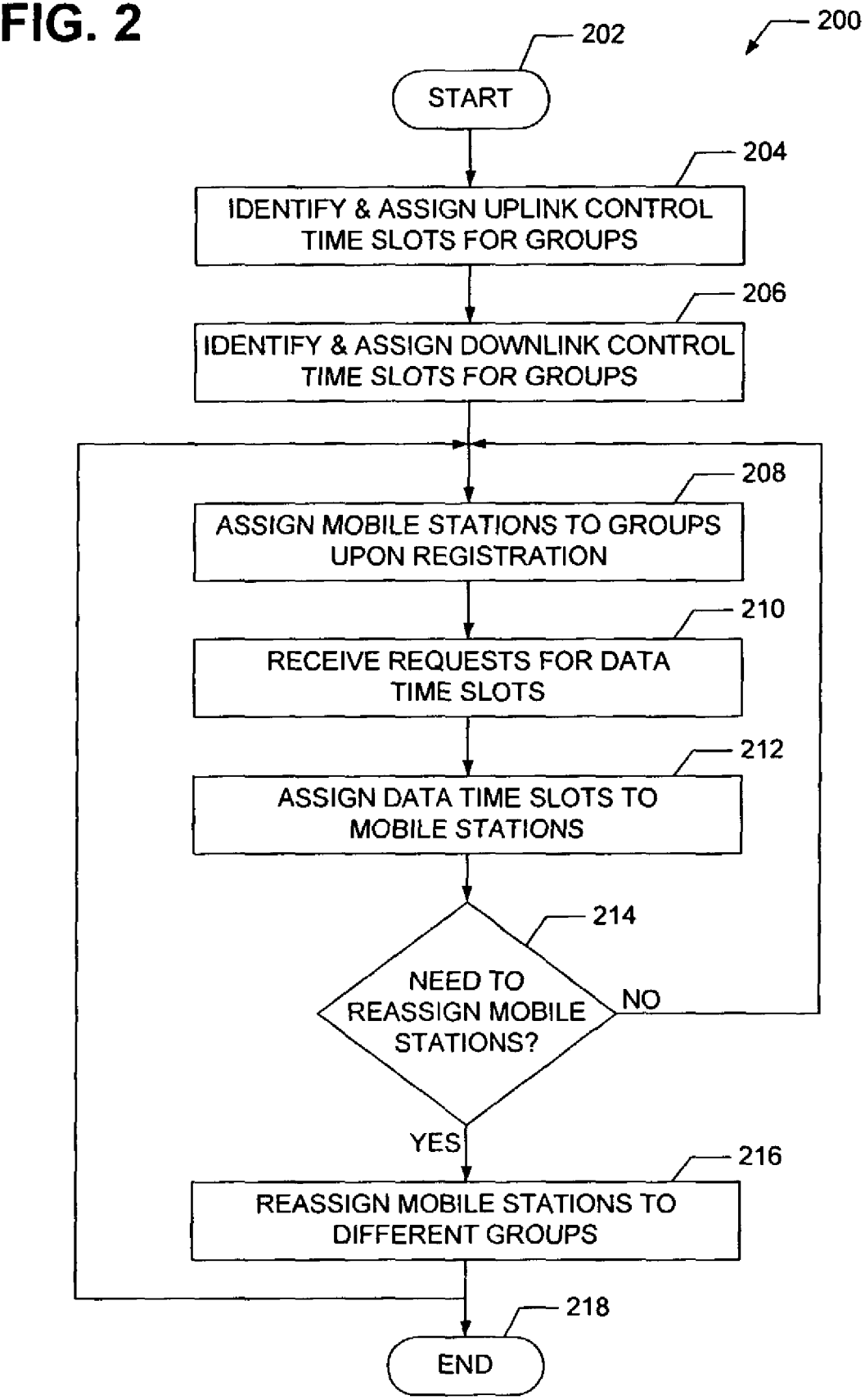
FIG. 2 is a simplified flowchart representing a technique, according to an embodiment of the present invention, for assigning uplink and downlink time slots to a plurality of half duplex wireless mobile stations.

Referring now to the drawings in which like numerals represent like elements or steps throughout the several views, FIG. 1 displays an exemplary base station system ("base station") 100 of a wireless communication system for half duplex over-the-air communications to and from a plurality of half duplex wireless mobile stations 110 (also sometimes referred to herein as "wireless mobile stations 110" or "mobile stations 110") according to a method 200 shown in FIG. 2 of the present invention. The base station 100 also communicatively connects, in a typical configuration, with switching systems of the wireless communication system that perform call processing, voice and data path switching, billing, and other functions. Generally, the base station 100 comprises a controller 102, a transmitter 104, a receiver 106, and one or more antenna(s) 108. Though shown as four separate units, units 102-108 may be combined or further broken down into additional units. The controller 102 includes a processing unit (i.e., preferably, a microprocessor or similar device(s) having similar characteristics and functionality to a microprocessor) capable of executing software instructions to control operation of the base station 100 and, hence, to control and enable communications between the base station 100 and the plurality of half duplex wireless mobile stations 110 via the transmitter 104, receiver 106, and antenna(s) 108. The detailed operation of the transmitter 104, receiver 106, and antenna(s) 108 are well-known in the art and need not be described here.

In controlling operation of the base station 100 and controlling and enabling communications between the base station 100 and the plurality of half duplex wireless mobile stations 110, the controller 102 allocates, or assigns, periodically repeating time slots 304, 306 (see FIG. 3) of periodically repeating time frames 300, 302 of uplink and downlink carriers $114_A$, $114_B$ to the half duplex wireless mobile stations 110 in accordance with the method 200 of the present invention. Uplink and downlink carriers $114_A$, $114_B$ may include one or more uplink carriers $114_A$ operating at different frequencies and one or more corresponding downlink carriers $114_B$ operating at different frequencies which are offset by a pre-determined frequency gap from the frequencies of their respective uplink carriers $114_A$. An uplink carrier $114_A$ is utilized by a mobile station 110 to transmit, or upload, control information (also sometimes referred to herein as "control data") or traffic data for receipt by a base station 100 by transmitting such control information or traffic data in respective control or data time slots of a time frame 300 thereof. A downlink carrier $114_B$ is employed by a mobile station 110 to receive, or download, control information or traffic data transmitted by a base station system 100 through receipt of such control information or traffic data in respective control or data time slots of a time frame 302 thereof. Generally, such communicated data comprises, for example and without limitation, data representative of voice, video, still images, user inputs, computer-generated outputs, and other similar information.

While perhaps somewhat counter-intuitive, it should be remembered that an uplink control time slot and uplink data time slots associated with a particular mobile station 110 may be present in the same or different uplink carriers $114_A$. Similarly, a downlink control time slot and downlink data time slots associated with a particular mobile station 110 may be present in the same or different downlink carriers $114_B$. However, all uplink data time slots corresponding to a particular mobile station 110 are, generally, present in the same uplink carrier $114_A$ and all downlink data time slots corresponding to a particular mobile station 110 are, typically, present in the same downlink carrier $114_B$.

It should be understood that the term "wireless mobile station" includes, but is not limited to, devices commonly referred to as radio telephones, cellular telephones, personal communications service (PCS) telephones, personal digital assistants, and other devices available now or in the future which communicate voice and/or data wirelessly. It should also be understood that the scope of the present invention includes, but is not limited to, any particular protocol for wireless communications or any particular type or form of base station system and/or controller described herein.

FIG. 2 displays a flowchart representation of method 200 implemented by the controller 102 to assign control and data time slots of uplink and downlink carriers $114_A$, $114_B$ for half duplex communication with the plurality of half duplex wireless mobile stations 110. While the method 200 is described herein with reference to a GSM communication system, it should be noted that the method 200 of the present invention may be applicable to other forms of wireless communication systems, including, but not limited to, UMTS TDD mode and other TDD wireless systems.

The method 200 starts at step 202 where controller 102 initializes various operating parameters based, at least in part, on data values received and stored during base station method or associated with 100 deployment by a non-volatile data storage device (within or associated with) controller 102 such as, for example and without limitation, an optical disk, a magnetic disk, read only memory, programmable read only memory, electrically programmable read only memory, battery backed-up random access memory, or other similar device. The data values stored by the non-volatile data storage device include, among other data values, the number of groups 112 into which a plurality of half duplex wireless mobile stations 110 will be divided and assigned to, or grouped, for purposes of control and data time slot allocation. Once set during deployment, the number of groups 112 does not, generally, change during operation of the base station 100. Two or more groups 112 of half duplex wireless mobile stations 110 may be used in accordance with method 200.

Note that individual groups 112 of half duplex wireless mobile stations 110 are identified herein with a subscript between "A" and "Z" to indicate that the present invention includes a plurality of different groups 112 of half duplex wireless mobile stations 110. Also note that individual half duplex wireless mobile stations 110 within a particular group 112 are identified herein with two subscripts, the first subscript indicating the group 112 to which the half duplex wireless mobile station 110 belongs (i.e., "A" to "Z") and the second subscript being between "1" and "N" to indicate that the particular group 112 may include a plurality of individual half duplex wireless mobile stations 110. It should also be noted, however, that a particular group 112 may, if appropriate, include only one half duplex wireless mobile station 110.

Once the base station system controller 102 initializes operating parameters, at step 204, the controller 102 identifies and assigns respective physical and logical time slots 304 in carrier uplink frames 300 as the control time slots and as the "anchor" data time slots (also sometimes referred to herein as the "anchor time slots") therein for each group 112 of half duplex wireless mobile stations 110. Similarly, at step 206, the controller 102 identifies and assigns respective physical and logical time slots 306 in carrier downlink frames 302 as the control time slots and as the anchor data time slots therein for each group 112 of half duplex wireless mobile stations 110. Thus, all of the mobile stations 110 of a group 112 of mobile stations 110 have the same uplink and downlink control time slots. However, even though the anchor data time slots for each group 112 of mobile stations 110 are logically positioned in time to coincide with the control time slots, the anchor data time slots for individual mobile stations 110 of a group 112 may physically coincide, or not coincide, with the control time slots for that group 112 of mobile stations 110. Note that by allowing a group's control time slot and anchor data time slots to coincide with the same physical time slots, the method 200 is operable with and supports the EGPRS packet voice protocol.

For instance, the control time slot and anchor data time slot in an uplink frame 300 for a particular group 112 of mobile stations 110 may, respectively, be physically and logically assigned to be the eighth time slot of the uplink frame 300 of a first uplink carrier 114$_A$. However, because the data time slots for a particular mobile station 110 of the group 112 may be assigned (as described below) subsequently in the uplink frame 300 of a second uplink carrier 114$_B$ (i.e., to avoid using the same physical data time slots as another mobile station 110 of the group 112), the anchor data time slot for that mobile station 110 is, physically, the eighth time slot of the uplink frame 300 of the second uplink carrier 114$_B$, but is logically, the eighth time slot of the uplink frame 300 of the first uplink carrier 114$_B$.

The physical control time slot of the uplink frame 300 (and, hence, the logical anchor data time slot) for each group 112 may be spaced maximally distant from the physical control time slot of the corresponding downlink frame 302 (and, hence, the logical anchor data time slot) for each group 112 in order to provide maximum availability of data time slots to the half duplex wireless mobile stations 110. That is, by assigning physical control time slots and logical anchor time slots of groups 112 maximally spaced apart in uplink and downlink frames 300, 302 and by individually allocating subsequent data time slots for use by half duplex wireless mobile stations 110 of the groups 112 as described below, the mobile stations 110 of each group 112 may use data time slots nearest the group's logical anchor data time slot that cannot be used by the mobile stations 110 of another group 112 due to idle time requirements before and/or after the transmission or reception of data. Such assignment, or allocation, of time slots results in more efficient use of the time slots 304, 306 of a carrier frame 300, 302 and tends to prevent the occurrence of situations in which there are no compatible, or usable, time slots for a half duplex wireless mobile station 112, even though unused, incompatible time slots 304, 306 may exist.

Figure 3:
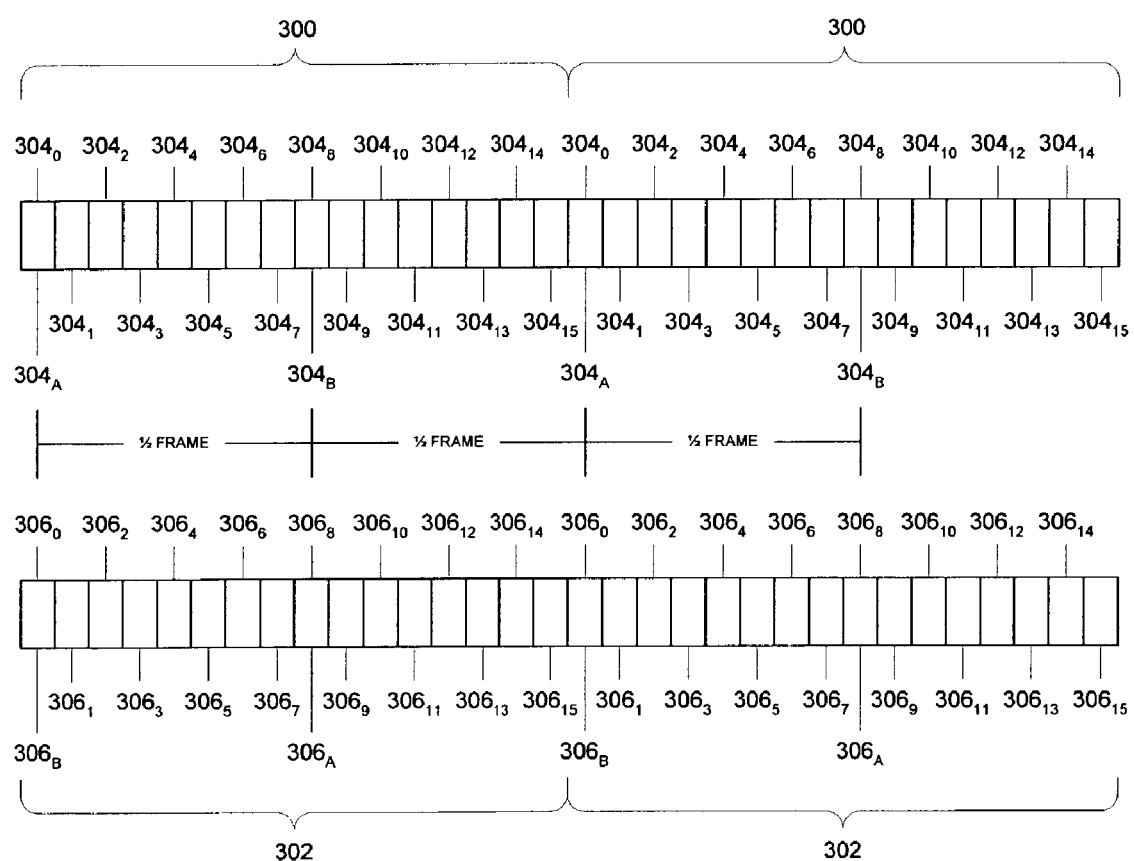
FIG. 3 is a simplified block diagram representing relationships between uplink and downlink control and data time slots which are assigned, according to the technique, of FIGS. 2, to different groups of half duplex wireless mobile stations.

FIG. 3 illustrates the maximally distant spacing of the control time slots (and, hence, anchor data time slots) of two exemplary groups 112 of half duplex wireless mobile stations 110 in two consecutive uplink frames 300 and in two consecutive corresponding downlink frames 302. As depicted in FIG. 3, each uplink frame 300 includes a plurality of uplink time slots 304 which are individually identified with subscript numerals zero through fifteen. Similarly, each downlink frame 302 includes a plurality of downlink time slots 306 which are also individually identified with subscript numerals zero through fifteen. Note that FIG. 3 actually displays two consecutive uplink frames 300 and two consecutive downlink frames 302 to enable better visualization, as described below, of the relationship of control time slots (and, hence, anchor data time slots) 304$_A$, 306$_A$ of uplink and downlink frames 300, 302 for a first group 112$_A$ of half duplex wireless mobile stations 110 and control time slots (and, hence, anchor data time slots) 304$_B$, 306$_B$ of uplink and downlink frames 300, 302 for a second group 112$_B$ of half duplex wireless mobile stations 110. Nonetheless, it should be understood that each uplink frame 300 and downlink frame 302 may be identical.

Operating according to method 200, the base station system controller 102 identifies and assigns uplink time slot 304$_0$ as the control time slot (and, hence, as the anchor data time slot) 304$_A$ of the uplink frame 300 for the first group 112$_A$ of half duplex wireless mobile stations 110 (i.e., where the subscript "A" indicates the first group 112$_A$ of half duplex wireless mobile stations 110). The base station system controller 102 also identifies and assigns downlink time slot 306$_8$ as the control time slot (and, hence, as the anchor data time slot) 306$_A$ of the downlink frame 300 for the first group 112$_A$ of half duplex wireless mobile stations 110 (i.e., where the subscript "A" again indicates the first group 112$_A$ of half duplex wireless mobile stations 110). During operation and as seen in FIG. 3, each uplink and downlink frame 300, 302 may be thought of as being communicated in a head-to-tail manner relative to a previous respective uplink or downlink frame 300, 302. As a consequence, for the first group 112$_A$ of half duplex wireless mobile stations 110, each control time slot (and, hence, each anchor data time slot) 304$_A$ of an uplink frame 300 will always be positioned, or oriented, relative to successive control time slots (and, hence, successive anchor data time slots) 306$_A$ of successive downlink frames 302 at a location midway therebetween (i.e., as indicated by there being a ½ frame between a control time slot 304$_A$ of an uplink frame 300 and successive control time slots 306$_A$ of downlink frames 302 as shown in FIG. 3). From the perspective of each control time slot (and, hence, each anchor data time slot) 306$_A$ of a downlink frame 302, each control time slot (and, hence, each anchor data time slot) 306$_A$ of a downlink frame 302 will always be positioned, or oriented, relative to successive control time slots (and, hence, anchor data time slots) 304$_A$ of successive uplink frames 300 at a location midway therebetween (i.e., as indicated by there being a ½ frame between a control time slot $306_A$ of a downlink frame 302 and successive control time slots $304_A$ of uplink frames 300 as shown in FIG. 3). Thus, the control time slots (and therefore anchor data time slots) $304_A$, $306_A$ for the first group $112_A$ of half duplex wireless mobile stations 110 are maximally spaced apart relative to one another in time.

In a similar manner, for the second group $112_B$ of half duplex wireless mobile stations 110, the base station system controller 102 identifies and assigns uplink time slot $304_8$ as the control time slot (and, hence, as the anchor data time slot) $304_B$ of the uplink frame 300 and downlink channel $306_0$ as the control time slot (and, hence, as the anchor data time slot) $306_B$ of the downlink frame 302 (i.e., where the subscript "B" indicates the second group $112_B$ of half duplex wireless mobile stations 110). If, again, each uplink and downlink frame 300, 302 is thought of as being communicated in a head-to-tail manner relative to a previous respective uplink and downlink frame 300, 302 during operation, each control time slot (and, hence, each anchor data time slot) $304_B$ of an uplink frame 300 for the second group $112_B$ of half duplex wireless mobile stations 110 will always be positioned, or oriented, relative to successive control time slots (and, hence, successive anchor data time slots) $306_B$ of successive downlink frames 302 at a location midway therebetween (i.e., as indicated by there being a ½ frame between a control time slot (and, hence, a anchor data time slot) $304_B$ of an uplink frame 300 and successive control time slots (and, hence, successive anchor data time slots) $306_B$ of downlink frames 302 as shown in FIG. 3). Correspondingly from the perspective of each control time slot (and, hence, each anchor data time slot) $306_B$ of a downlink frame 302 for the second group $112_B$ of half duplex wireless mobile stations 110, each control time slot (and, hence, each anchor data time slot) $306_B$ of a downlink frame 302 will always be positioned, or oriented, relative to successive control time slots (and, hence, successive anchor data time slots) $304_B$ of successive uplink frames 300 at a location midway therebetween (i.e., as indicated by there being a ½ frame between a control time slot $306_B$ of a downlink frame 302 and successive control time slots $304_B$ of uplink frames 300 as shown in FIG. 3). Thus, as with the control time slots (and, hence, the anchor data time slots) $304_A$, $306_A$ of the first group $112_A$ of half duplex wireless mobile stations 110, the control time slots (and, hence, the anchor data time slots) $304_B$, $306_B$ for the second group $112_B$ of half duplex wireless mobile stations 110 are maximally spaced apart relative to one another in time.

At step 208 of method 200, the base station system controller 102 uses the number of groups 112 of half duplex wireless mobile stations 110 to establish a plurality of groups 112 for half duplex wireless mobile stations 110. Then, upon registration of individual mobile stations 110 with the base station system 100, the controller 102 assigns the mobile stations 110 to particular groups 112 of the plurality of groups 112 having control time slots (and, hence, anchor data time slots) $304_{A-Z}$, $306_{A-Z}$ as described above. In assigning the half duplex wireless mobile stations 110 initially to the groups 112, the base station system controller 102, preferably, assigns the half duplex wireless mobile stations 110 evenly across the plurality of groups 112 to balance load.

Once the half duplex wireless mobile stations 110 are assigned to particular groups 112, the controller 102 receives requests for specific numbers of uplink or downlink data time slots (e.g., the same number of data time slots in each direction) from the half duplex wireless mobile stations 110 at step 210. In response, the controller 102 assigns the desired number of uplink or downlink data time slots 304, 306 to each requesting half duplex wireless mobile station 110 at step 212. Such assignments are made by the controller 102 first recalling the logical location in time of the anchor data time slots 304, 306 for the mobile station's group 112 for both data communication directions (i.e., the location in time being identified relative to the start of the uplink frame 300 and downlink frame 302). Next, the controller 102 determines whether the required number of data time slots 304, 304 are available for use either before, after, or before and after the anchor data time slots 304, 306, in time, for each of the potentially usable uplink and downlink carriers $114_A$, $114_B$ (i.e., since there may be more than one uplink and more than one downlink frequencies available for use by the controller). Upon locating usable groups of data time slots 304, 306 in the uplink and downlink frames 300, 302 of uplink and downlink carriers $114_A$, $114_B$, the controller 102 assigns the located data time slots 304, 306 to the mobile station 110 that requested them. Because the data time slots 304, 306 are allocated starting at anchor data time slots of the group 112 to which a requesting mobile station 110 belongs and by assigning data time slots near the anchor data time slots in relative directions before, after, or before and after the anchor data time slots, the method of allocation is referred to as a "grow from anchor" or "grow from center" method with the anchor data time slots being at the "center" of the assigned data time slots.

In determining whether appropriate data time slots are available, the controller 102 looks for data time slots 304, 306 which are near the appropriate anchor data time slot, which are consecutively adjacent to one another in time (i.e., define a contiguous group or block of data time slots 304, 306), and that are not already assigned to another mobile station 110 or unusable due to idle time constraints. When the controller 102 determines whether such a contiguous group of data time slots 304, 306 exists in the uplink or downlink frames 300, 306 of the uplink or downlink carrier $114_A$, $114_B$ in which the uplink or downlink control time slots are physically present, the controller 102 looks for groups of data time slots 304, 306 which include data time slots 304, 306 either before, after, or before and after the control time slots in time, but which do not include the control time slots because control and traffic data cannot be communicated via the same time slot. Hence, in such a situation, the selected data time slots 304, 306 may not be actually contiguous in time if one or more of the assigned data time slots are either before or after the control time slots. However, in uplink and downlink carriers $114_A$, $114_B$ in which the control time slots are not physically present, the assigned data time slots define a, generally, contiguous group of data time slots, including the appropriate anchor data time slots. It should be understood that the scope of the present invention includes all time slot allocation methods which may assign data time slots, whether contiguous or not, that are near an anchor data time slot and extend, or are located, away (i.e., grow outward) from that anchor data time slot in relative directions before, after, or before and after the position of the anchor data time slot in time.

For example and referring to FIG. 3 for reference, the control and anchor data time slots in the downlink frame 302 are time slot $306_A$ (i.e., also identified as $306_8$) for the first group $112_A$ of half duplex wireless mobile stations 110. If a half duplex wireless mobile station 110 of the first group $112_A$ requests three data time slots, the controller 102 investigates all of the potential downlink carriers $114_B$ (i.e., at different frequencies) to determine whether the three data time slots are available for use by the mobile station 110.

Note that a similar process is followed with respect to the assignment of data time slots in the uplink frames 300 of all potential uplink carriers $114_A$.

Continuing with the example and in considering the downlink carrier $114_B$ in which the downlink control time slot is present, the controller 102, preferably, considers the availability of time slots $306_5$, $306_6$, and $306_7$ before the anchor data time slot in time and time slots $306_9$, $306_{10}$, and $306_{11}$ after the anchor data time slot in time, but does not consider the availability of time slot $306_8$ because it is also the control time slot. Based upon the availability of the time slots, many different combinations and permutations of selections are possible with all or some of the selected time slots being before the anchor data time slot in time, all or some of the selected time slots being after the anchor data time slot in time, or some of the selected time slots being before and after the anchor data time slot in time. However, all selected time slots are, generally, near the anchor data time slot in time. For instance, if time slots $306_5$, $306_6$, and $306_7$ are available, the controller 102 may assign those time slots to the requesting mobile station 110; if time slots $306_6$, $306_7$, and $306_9$ are available, the controller 102 may assign those time slots to the requesting mobile station 110; if time slots $306_7$, $306_9$, and $306_{10}$ are available, the controller 102 may assign those time slots to the requesting mobile station 110; and, if time slots $306_9$, $306_{10}$, and $306_{11}$ are available, the controller 102 may assign those time slots to the requesting mobile station 110.

Continuing with the example and in considering downlink carriers $114_B$ in which the downlink control time slot is not present, the controller 102 considers the availability of the anchor data time slot $306_8$, of time slots $306_6$ and $306_7$ before the anchor data time slot in time, and of time slots $306_9$ and $306_{10}$ after the anchor data time slot in time. Depending on which time slots are available, many different combinations and permutations of selections are possible with the selected time slots including the anchor data time slot $306_8$ and the remainder of the selected time slots being before the anchor data time slot in time, after the anchor data time slot in time, or before and after the anchor data time slot in time. For instance, if anchor data time slot $306_8$ is available and if time slots $306_6$ and $306_7$ are also available, the controller 102 may assign those time slots to the requesting mobile station 110; if anchor data time slot $306_8$ is available and if time slots $306_7$ and $306_9$ are available, the controller 102 may assign those time slots to the requesting mobile station 110; and, if anchor data time slot $306_8$ is available and if time slots $306_9$ and $306_{10}$ are available, the controller 102 may assign those time slots to the requesting mobile station 110.

Figure 4:
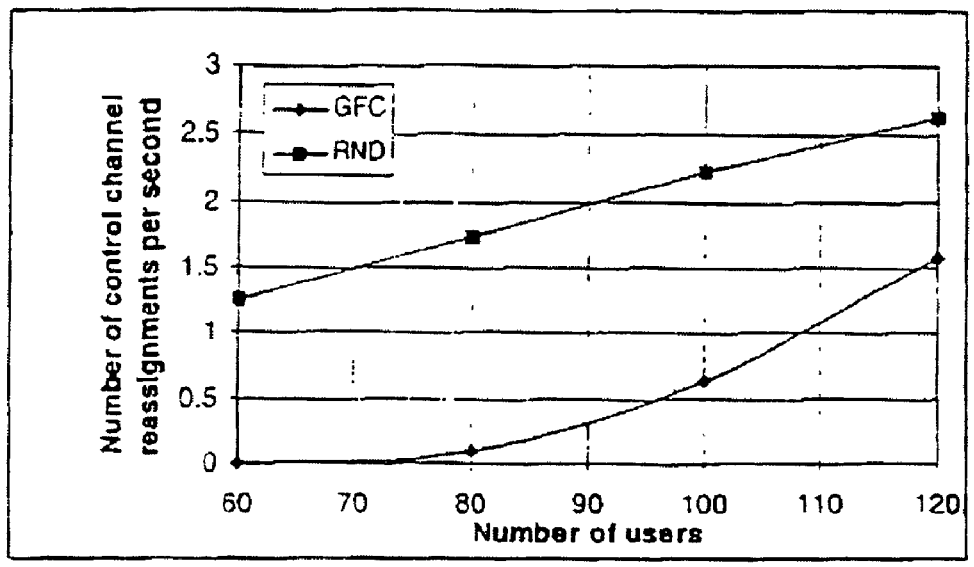
FIG. 4 is a simplified graphical representation which illustrates a comparison of the number of control time slot reassignments per second versus the number of users for a conventional random time slot allocation and a time slot allocation technique of the present invention.

Returning now to the description of method 200 with reference to FIG. 2, at step 214, if the controller 102 is able to assign the requested number of data time slots to a half duplex wireless mobile station 110 of a particular group 112, the controller 102 branches back to operate in accordance with step 208 where it, once again, assigns newly registered mobile stations 110 to appropriate groups 112 of mobile stations 110. However, if the controller 102 is unable to assign the requested number of data time slots to a particular mobile station 110 at step 212, the controller 102 reassigns the wireless mobile station 110 to a different group 112 of the plurality of groups 112 of half duplex wireless mobile stations 110. Such a situation may arise, for instance, when a particular wireless mobile station 110 demands a large number of time slots 304, 306 for data communication or belongs to a group 112 having a large demand for traffic time slots 304, 306. It should be noted that the number of such reassignments is, generally, small compared to the number of reassignments when a random time slot allocation method is employed by a controller 102. This advantage of method 200 is illustrated graphically in FIG. 4 which shows the number of control time slot reassignments per second versus the number of users for a conventional random time slot allocation method (i.e., denoted in FIG. 4 as the "RND" method) and methods 200 of the present invention (i.e., denoted in FIG. 4 as the "Grow From Center" or "GFC" method). The results displayed in FIG. 4 are based on 8 carriers, 2 control channels, full rate, Tt=3, Th=2, Thop=0, and voice activity of 100/235.

Figure 5:
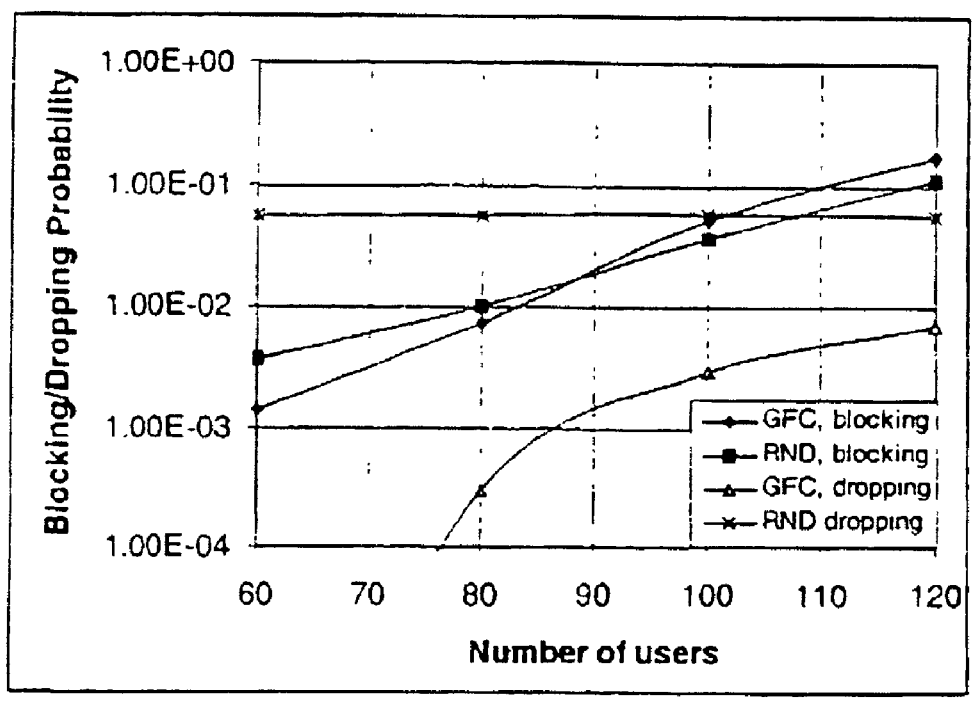
FIG. 5 is a graphical representation which displays a comparison of the dropping and blocking probabilities associated with a conventional random time slot allocation technique and a time slot allocation technique of the present invention.

It should be also noted, as illustrated in FIG. 5, that the dropping probability associated with methods 200 of the present invention (i.e., denoted in FIG. 5 as the "GFC" method) are much lower than the dropping probability associated with a random time slot allocation method (i.e., denoted in FIG. 5 as the "RND" method). Further, as seen in FIG. 5, the blocking probabilities are approximately the same. The basis for the results and relationships of FIG. 5 is 8 carriers, 2 control channels, full rate, Tt=3, Th=2, Thop=0, and voice activity of 100/235.

Referring back to FIG. 2, method 200 stops at step 218, for instance, if the base station 100 is shut down or otherwise taken out of service. It should be noted, however, that time slot allocation is a dynamic process that is performed repeatedly during operation of a base station 100 as mobile stations 110 enter into and leave the base station's service area. It should also be noted that, even though not addressed in the description herein, once a mobile station 110 leaves the base station's service area (e.g., is handed-off to another base station 100), the time slots assigned to that mobile station 110 according to method 200 are released for reassignment by the controller 102 to other mobile stations 110.

Whereas this invention has been described in detail with particular reference to a preferred embodiment, it is understood that variations and modifications can be effected within the spirit and scope of the invention, as described herein before and as defined in the appended claims. The corresponding structures, materials, acts, and equivalents of all means or step plus function elements, if any, in the claims below are intended to include any structure, material, or acts for performing the functions in combination with other claimed elements as specifically claimed.

The invention claimed is:

1. A method of allocating time slots to wireless mobile stations comprising:
   assigning control time slots of a frame of a first carrier, associated with wireless communication in a first direction, to a plurality of wireless mobile stations;
   assigning each control time slot of one or more control time slots of a frame of a second carrier, associated with wireless communication in a second direction, to the plurality of wireless mobile stations to a position corresponding to a position in time that is between two control time slots of the first carrier and maximally spaced in time relative to the positions of the two control time slots; and
   assigning one or more data time slots used to communicate data, to a particular wireless mobile station of said plurality of wireless mobile stations, to positions before or after the position of a control time slot of one of the carriers beginning from positions that are as near as possible in time to the control time slot of the carrier to positions that are farther from the position in time of the control time slot of the carrier.

2. The method of claim 1, further comprising assigning one or more of the control time slots of the frame of the second carrier to a position in time that is midway between a position in time of two of the control time slots of the first carrier.

3. The method of claim 1, further comprising assigning one or more of the data time slots adjacent in time to a control time slot of one of the carriers.

4. The method of claim 1, wherein the method further comprises assigning a data time slot of a frame of a third carrier to the wireless mobile station of the plurality of wireless mobile stations that coincides with the position in time of a control time slot of the time frame of the first carrier, wherein the time frame of the third carrier is associated with wireless communication in the first direction.

5. An apparatus for allocating time slots to a plurality of wireless mobile stations in a wireless communication system, said apparatus comprising:

a controller adapted to;

assign control time slots of a frame of a first carrier, associated with wireless communication in a first direction, to a plurality of wireless mobile stations;

assign each control time slot of one or more control time slots of a frame of a second carrier, associated with wireless communication in a second direction, to the plurality of wireless mobile stations to a position corresponding to a position in time that is between two control time slots of the first carrier and maximally spaced in time relative to the positions of the two control time slots; and assign one or more data time slots used to communicate data, to a particular wireless mobile station of said plurality of wireless mobile stations, to positions before or after the position of a control time slot of one of the carriers beginning from positions that are as near as possible in time to the control time slot of the carrier to positions that are farther from the position in time of the control time slot of the carrier.

6. The apparatus of claim 5, wherein the controller is further adapted to assign one or more of the control time slots of the frame of the second carrier to a position in time that is midway between a position in time of two of the control time slots of the first carrier.

7. The apparatus of claim 5, wherein the controller is further adapted to assign one or more of the data time slots adjacent in time to a control time slot of one of the carriers.

8. The apparatus of claim 5, wherein the controller is further adapted to assign a data time slot of a frame of a third carrier to the wireless mobile station of the plurality of wireless mobile stations that coincides with the position in time of a control time slot of the time frame of the first carrier, wherein the time frame of the third carrier is associated with wireless communication in the first direction.

\* \* \* \* \*